(12) United States Patent
Renquist

(10) Patent No.: US 10,737,920 B2
(45) Date of Patent: Aug. 11, 2020

(54) JACK DEVICE AND SYSTEM

(71) Applicant: John Howard Renquist, Valley Center, CA (US)

(72) Inventor: John Howard Renquist, Valley Center, CA (US)

( * ) Notice: Subject to any disclaimer, the term of this patent is extended or adjusted under 35 U.S.C. 154(b) by 224 days.

(21) Appl. No.: 15/525,903

(22) PCT Filed: Nov. 4, 2015

(86) PCT No.: PCT/US2015/059066
§ 371 (c)(1),
(2) Date: May 10, 2017

(87) PCT Pub. No.: WO2016/077122
PCT Pub. Date: May 19, 2016

(65) Prior Publication Data
US 2018/0305191 A1    Oct. 25, 2018

Related U.S. Application Data

(60) Provisional application No. 62/077,698, filed on Nov. 10, 2014.

(51) Int. Cl.
*B66F 5/04* (2006.01)
*B66F 7/28* (2006.01)
*B64F 5/50* (2017.01)

(52) U.S. Cl.
CPC .................. *B66F 5/04* (2013.01); *B66F 7/28* (2013.01); *B64F 5/50* (2017.01); *B66F 2700/05* (2013.01)

(58) Field of Classification Search
CPC ...... B66F 7/10; B66F 7/26; B66F 7/28; B66F 17/00; B66F 17/006; B66F 5/00; B66F 5/04; B66F 2700/05; B66F 1/00; B66F 3/00; B66F 3/24; B66F 7/04; B66F 7/085; B66F 7/00; B66F 7/06; B66F 3/36; B66F 15/00; B66F 2700/052; B64F 5/50
USPC ........... 254/93 R, 3 B, 8 R, 9 B, 89 H, 10 R, 254/93 H, 105, 133 R, 133 A, 134
See application file for complete search history.

(56) References Cited

U.S. PATENT DOCUMENTS

| | | | | |
|---|---|---|---|---|
| 2,903,258 A | * | 9/1959 | Jovanovich | B25H 1/0007 248/176.1 |
| 3,659,824 A | * | 5/1972 | Johnson | B66F 3/24 254/124 |
| 3,902,699 A | * | 9/1975 | Brackett | B66F 3/16 254/93 R |

(Continued)

FOREIGN PATENT DOCUMENTS

| | | | |
|---|---|---|---|
| EP | 0287044 A1 | * 10/1988 | .......... B66F 3/46 |
| EP | 0287044 A1 | 10/1988 | |

(Continued)

*Primary Examiner* — Orlando E Aviles
*Assistant Examiner* — Robert F Neibaur
(74) *Attorney, Agent, or Firm* — Troutman Sanders LLP

(57) ABSTRACT

A lifting device that includes a central portion and first and second laterally extending lifting arms. Each arm extends away from opposite sides of the central portion and includes a lifting cradle disposed on a distal portion of the associated laterally extending lifting arm. Each laterally extending lifting arm and associated lifting cradle is operable to securely engage with a gear leg of a vehicle and lift when an upward force is received by the central portion.

18 Claims, 10 Drawing Sheets

(56) References Cited

U.S. PATENT DOCUMENTS

| | | | | |
|---|---|---|---|---|
| 4,066,243 | A * | 1/1978 | Johnson | B21D 1/12 |
| | | | | 254/133 R |
| 4,223,856 | A * | 9/1980 | DiVincenzo | B64F 1/22 |
| | | | | 244/50 |
| 4,269,394 | A * | 5/1981 | Gray | B66F 13/00 |
| | | | | 254/134 |
| 4,640,495 | A * | 2/1987 | Parsons | B66F 5/04 |
| | | | | 254/134 |
| 5,232,203 | A * | 8/1993 | Butts | B66F 15/00 |
| | | | | 254/131 |
| 5,947,447 | A * | 9/1999 | Sorensen | B66F 5/04 |
| | | | | 254/1 |
| 6,608,262 | B1 * | 8/2003 | Eiswerth | B66F 3/36 |
| | | | | 177/146 |
| 7,296,787 | B2 * | 11/2007 | Barrios | B25H 1/0014 |
| | | | | 254/133 R |
| 7,717,401 | B2 * | 5/2010 | Diaz | B66F 3/36 |
| | | | | 254/133 R |
| 8,336,900 | B2 * | 12/2012 | Perry | B60S 13/00 |
| | | | | 180/904 |
| 8,960,645 | B1 * | 2/2015 | Stewart | B64F 5/40 |
| | | | | 254/133 R |
| 2010/0108445 | A1 | 5/2010 | Kritzer | |
| 2012/0032124 | A1 | 2/2012 | Drake | |

FOREIGN PATENT DOCUMENTS

| | | | |
|---|---|---|---|
| EP | 1378448 | B1 | 12/2004 |
| SU | 520904 | A1 | 7/1976 |

* cited by examiner

JACK DEVICE AND SYSTEM

CROSS-REFERENCE TO RELATED APPLICATION

This Application is a United States national stage entry of an International Application serial no. PCT/US2015/059066 which claims benefit under 35 U.S.C § 119(e) of U.S. Provisional Patent Application Ser. No. 62/077,698, filed Nov. 10, 2014, and entitled "Improved jack device and system," the disclosures of which are incorporated by reference in their entirety as if fully set forth below.

FIELD

The present disclosure relates generally to devices and systems related to hydraulic lifting devices and more specifically, for hydraulic mechanisms such as hydraulic floor jacks that couple to and lift vehicles such as personal aircraft or other structures supported by gear legs with wheels.

BACKGROUND

Modern personal and commercial transportation vehicles have become increasingly accessible over the years. With more people owning and/or operating vehicles such as commercial and/or personal aircraft, there has been an appreciable increase in the required maintenance or repair of said vehicles. With respect to vehicles such as aircraft with geared legs supported by wheels, occasionally it may be required to lift the vehicle to attend to a repair, undertake maintenance or otherwise visually inspect the same.

Previous approaches to lifting vehicles of this nature such as the popular Cessna® line of aircraft with three-wheeled tail dragging landing gear configuration, for example, include providing a singular, tapered cradle that slides up the aircraft's flat style landing gear at the base. In other words, the single tapered cradle is positioned low and adjacent or nearby the associated gear wheel. A user may lift this aircraft by positioning a hydraulic lift such as a conventional bottle jack underneath the single tapered cradle and then engaging the cradle with a single gear leg of the aircraft. As a result, only one gear leg of the aircraft is capable of being lifted at a time.

In practice, as said single tapered cradle lifts the corresponding gear leg of the aircraft, the center of lift of the aircraft has tends to shift inboard about the center wheel of the aircraft. This unfortunately causes the aircraft to become unstable and therefore dangerous to both the user and unnecessarily risks harm to the aircraft itself.

Accordingly, there exists a need for an approach to lifting vehicles such as aircrafts in a safe and secure manner to protect from operator injury and harm to the vehicle itself. There also exists a need to safely and effectively lift vehicles by utilizing currently known tools such as conventional hydraulic lift mechanisms in order to conserve overall costs to operators. There also exists a need to provide a tool that safely and effectively lifts multiple sized vehicles so that operators are not required to purchase many individual tools for different types of vehicles and instead can adjust a single tool to be used between different sized vehicles as well as be operable for use with existing hydraulic lift mechanisms. The presently disclosed embodiments address these and other needs in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In other embodiments, a lifting device may comprise a central portion and first and second laterally extending lifting arms. Each arm may extend away from opposite sides of the central portion and may comprise a lifting cradle disposed on a distal portion of the associated laterally extending lifting arm. Preferably, the lifting cradle is positioned on the tip of the distal portion furthest from the central portion of the device. Each laterally extending lifting arm and associated lifting cradle may be operable to securely engage with gear legs of a vehicle and lift the vehicle when an upward force is received by the central portion. However, the lifting device is not so limited and instead, each extending lifting arm and associated lifting cradle may be operable to securely engage with a plurality of lifting regions of a lower surface of a vehicle and lift the vehicle between a plurality of elevations when an upward force is applied from the central portion through the lifting cradle to the corresponding lifting region of the vehicle.

The laterally extending arms may be integrally formed with the central portion or may be removably attached thereto. In certain embodiments, a distance between each of the lifting cradles may be adjustable so that the lifting device can be used with multiple sized vehicles. In this respect, each laterally extending arm may be slidably inserted into a corresponding arm receiver of the central portion between a plurality of fixed positions and/or orientations. Each laterally extending arm may be securely engaged in each fixed position through use of one or more fastening mechanisms such as bolts, cables, clamps, dowels, hooks, joints, keys, latches, locks, lugs, nuts, pins, or screws, in isolation or in combination.

In certain embodiments, the lifting cradle may be pivotally connected to the distal portion of the laterally extending arm, wherein the distal portion may comprise an externally positioned rotational shaft corresponding to a rotational shaft receiver of the lifting cradle so that each lifting cradle is operable to rotate about the rotational shaft. This is particularly advantageous since the lifting cradle is able to adjust to the gear legs of the vehicle during lifting as they tend to flex or otherwise move between being raised and lowered.

In other embodiments, each lifting cradle may be defined by a pad operable to securely engage with one of the lifting regions of the vehicle. Each pad may be relatively rigid or pliable as needed or required. Whether rigid or pliable, the pad of at least one lifting cradle may include a predetermined curve operable to conform to the contour of one of the lifting regions of the vehicle. Additionally, the pad may be constructed from a traction inducing surface operable to avoid and/or reduce slippage between the corresponding lifting cradle and the lifting region of the vehicle during lifting.

Each laterally extending arm may further comprise a proximal portion, the proximal portion being slidably received by the central portion and the distal portion extending away from the proximal portion at an upward angle. The upward angle may range between 90 and approximately 180 degrees with respect to the proximal portion. The upward angle may be adjustable between a plurality of fixed positions by operatively connecting the proximal and distal portions to each other through an adjustable hinge.

Preferably, the vehicle being lifted is an aircraft comprising landing gear with a plurality of wheel supported gear legs but the lifting device is not so limited. The vehicle may be any vehicle with gear legs that requires lifting from time to time for maintenance, service, inspection or the like.

The central portion of the lifting device may comprise a hydraulic mechanism receiver oriented generally orthogonal to a laterally extending arm receiver operable to receive the laterally extending arms. In this respect, the laterally extending arms are removably attached or otherwise adjusted with the arm receiver above the mechanism receiver. Accordingly, the hydraulic mechanism receiver and/or the laterally extending arm receiver may be bored out with a circular, elliptical, rectangular, or otherwise polygonal shaped cross-section.

In other embodiments, a lifting system is disclosed comprising the herein described lifting device with a hydraulic mechanism received by or integrally formed with the central portion. In this embodiment, the vehicle may be an aircraft comprising landing gear with a plurality of wheel supported gear legs and each cradle may be operable to adjustably lift the vehicle between a plurality of elevations with respect to the ground surface on which the vehicle may be seated.

Additionally, a method of lifting gear legs of a vehicle is disclosed, the method may include the following steps: positioning a lifting device under the gear legs of the vehicle, the lifting device may include a central portion; first and second laterally extending lifting arms that extend away from opposite sides of the central portion, each arm comprising a lifting cradle disposed on a distal portion of the associated laterally extending lifting arm; securely engaging each lifting cradle with one of the gear legs of the vehicle; and applying a lifting force to the central portion thereby causing each lifting cradle to lift the corresponding gear leg of the vehicle.

Each of the lifting cradles may lift the corresponding gear leg simultaneously and each lifting cradle may be securely engaged with an upper portion of one of the gear legs adjacent to or nearby where the associated leg extends away from the vehicle. The method may further comprise: rotating each lifting cradle about a rotatable shaft of the distal portion of each laterally extending lifting arm as the vehicle is lifted and/or adjusting a length between lifting cradles by slidably translating the one or both of the laterally extending arms along a corresponding arm receiver of the central portion between a plurality of fixed positions. The method may also comprise: operatively connecting a hydraulic mechanism to the central portion, wherein the lifting force is applied to the central portion by the hydraulic mechanism.

The method is not limited to lifting from the legs of the vehicle, however, and instead each lifting cradle may instead be securely engaged with a plurality of lifting regions disposed on the lower surface of the vehicle. In this respect, applying a lifting force to the central portion may thereby cause each lifting cradle to lift the corresponding lifting region of the vehicle to one or more elevations. The lifting region may be disposed adjacent one or more bulkheads or reinforced lifting points of the vehicle.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The features of the present disclosure may be economically molded by using one or more distinct parts and associated components which, when assembled together for application with a conventional hydraulic floor jack, or integrally formed with a hydraulic floor jack, in an economical fashion, wherein the features of the present disclosure may form the disclosed device regardless of the particular form. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a field technician. However, this term is not limited to end users or technicians and thus encompasses a variety of persons who can use the disclosed systems and methods.

The system and methods described herein for securely lifting multiple gear legs of different sized types and sizes of vehicles through a single lifting device and point of control. The herein described approach is safe to use for the operator and reduces exposure of harm to the vehicle itself. Moreover, the herein described approach is easy to manufacture and can be adapted to conventional hydraulic lift mechanisms thereby reducing the ultimate cost for the operator (e.g. field technician or vehicle owners interesting in carrying out home repair) and the need to purchase special tools for each vehicle. Said system and methods can now be better understood turning to the following detailed description. It is to be expressly understood that the illustrated embodiments are set forth as examples and not by way of limitations on the embodiments as ultimately defined in the claims.

Figure 1:
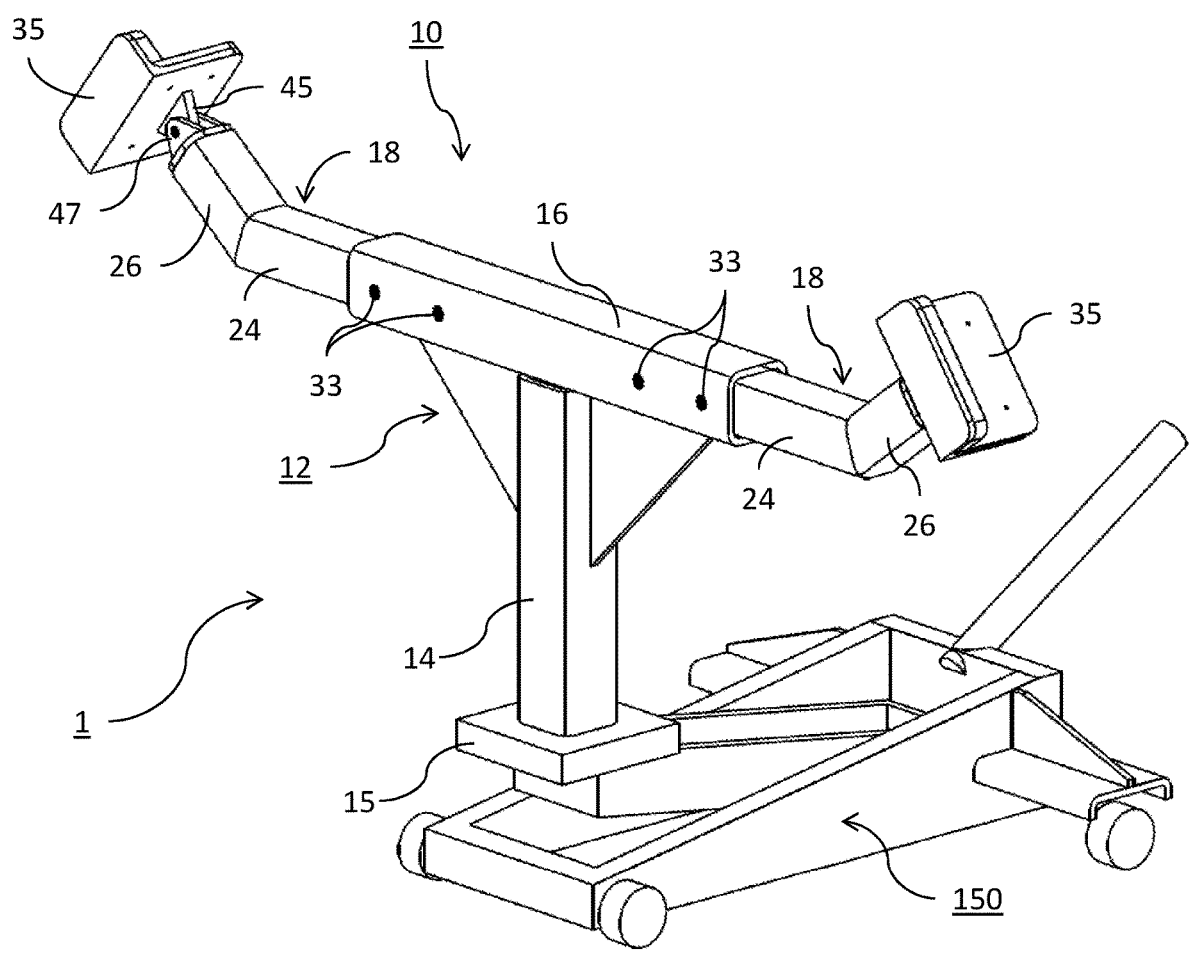
FIG. 1 is a forward perspective view of an exemplary embodiment of the herein described improved jack system, wherein the disclosed jack device is depicted coupled to a conventional hydraulic floor jack.
Figure 2:
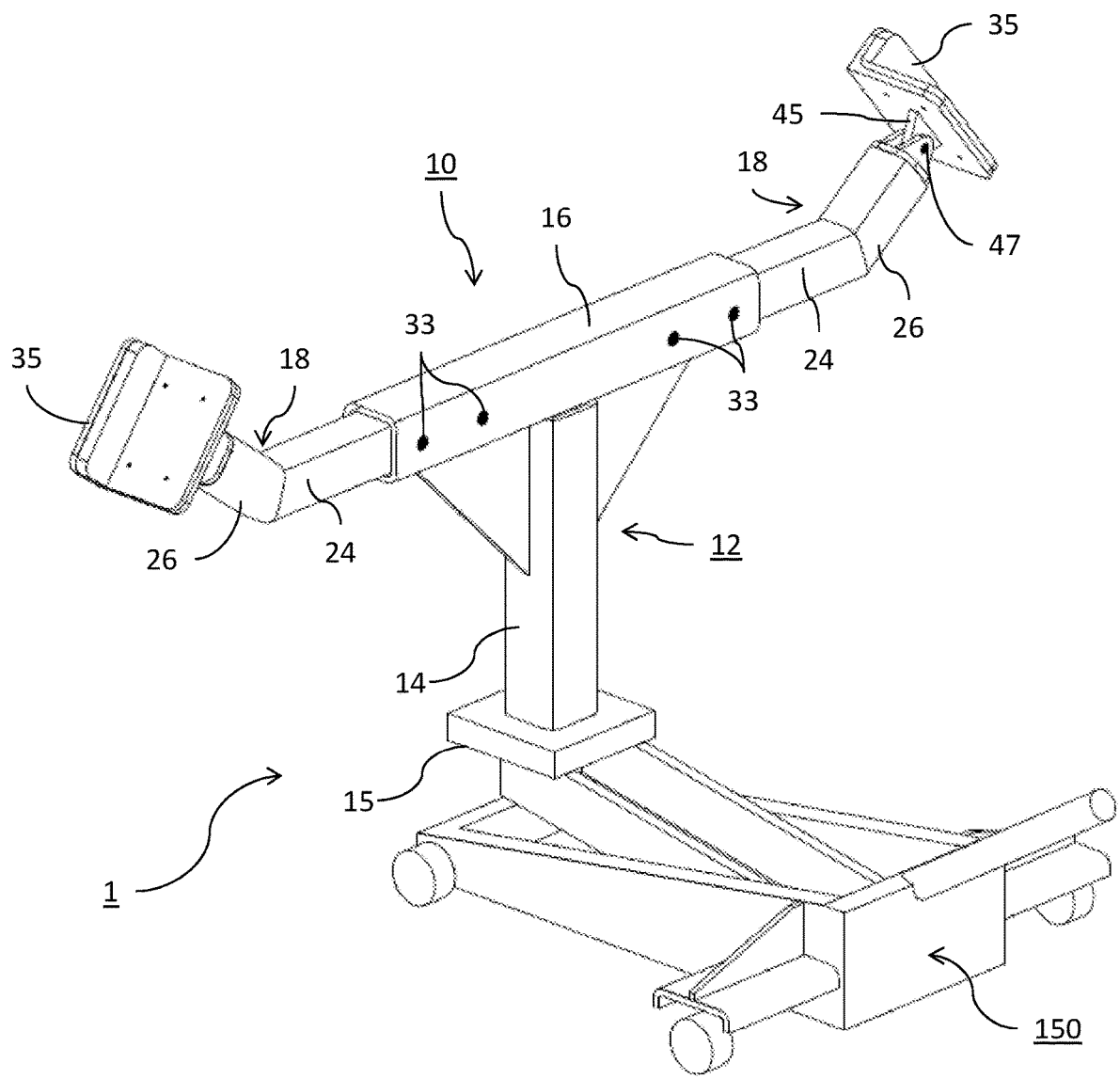
FIG. 2 is a rear perspective view of the embodiments of FIG. 1, wherein the improved jack system has been rotated so that its rear portion is facing forward.

Turning to FIG. 1 is a forward perspective view of an exemplary embodiment of the herein described system 1 of lifting a vehicle, wherein lift device 10 can be seen assembled with a conventional hydraulic lifting device 150 (hereinafter "mechanism 150") such as a conventional floor jack. However, the herein described device 10 is not so limited and in other embodiments may be designed to assembly with a bottle jack, whiskey jack, barrel jack, a pneumatic jack, and strand jack or any other type of jack operable for lifting a vehicle or stands that merely keep the vehicle elevated. FIG. 2 is a rear perspective view of the embodiment depicted in FIG. 1, wherein mechanism 150 is now facing forward.

Device 10 may comprise a central portion 12 with upper 16 and lower 14 portions. Lower portion 14 may be operable to releasably couple, mount or otherwise attach to mechanism 150. In this respect, portion 14 may be received by corresponding device receiver 15 of mechanism 150. Preferably, lower portion 14 may be slidably inserted onto or into receiver 15. Receiver 15 may in turn comprise a flange or shoulder operable to securely support portion 14 and prevent device 10 from rotating about portion 14 itself. However, system 1 is not so limited such that device 10 and mechanism 150 may be integrally formed with each other.

In embodiments where mechanism 150 is releasably coupled to device 10, portion 14 may therefore be bored out so that it can be securely received by receiver 15. Portion 14 may be oriented generally orthogonal to portion 16 and extend therefrom with a cross section that may preferably be rectangular or otherwise in a polygonal shape designed to prevent rotation of portion 14 once received by receiver 15. Alternatively, portion 14 may comprise a circular, elliptical, or otherwise rounded cross-section.

Preferably, the angled edge supports of central portion 12 may be positioned between portions 16 and 14 so that loads received by device 10 may be transferred across the entire device as opposed to warping, fracturing, or otherwise harming unsupported locations on portion 16. Portion 16 may preferably be bored out so that it can securely receive and/or securely control movement, rotational or otherwise, of laterally extending arms 18 as described more particularly below. When device 10 is assembled with mechanism 150, portion 16 may be substantially parallel with the ground. Similar to portion 14, portion 16 may bored out and comprise a cross-section that is rectangular or otherwise in a polygonal shape designed to prevent rotation of corresponding arm 18 once operatively coupled to portion 16. Alternatively, portions 14 and 16 may be solid and portion 16 in particular may comprise a circular, elliptical, or otherwise rounded cross-section.

Portions 14 and 16 may be integrally formed with each other or may be otherwise mounted through one or more removable or permanent fasteners, locks, welds or the like. Each of portions 14 and 16 and associated supports may be constructed from any suitable material including metals such as steel, square metal tubing, or the like.

As previously mentioned, device 10 may comprise laterally extending arms 18, each arm 18 being operable to extend away from portion 16. Preferably, each arm 18 may be slidably inserted into and/or received by portion 16 and translated between one or more fixed positions. Each arm 18 may comprise a proximal portion 24 configured to be positioned adjacent to or nearby portion 16 and a distal portion 26 positioned opposite portion 24. A lifting cradle 35 may be disposed on the outer tip of portion 26, wherein each cradle 35 is designed to securely yet safely engage with a corresponding gear leg of a vehicle (e.g. an aircraft) as described more particularly below.

While it is preferred that arm 18 is removably attachable with portion 16, in other embodiments arm 18 may be integrally formed with portion 16 and yet slidably adjustable along or inside portion 16 between one or more fixed positions. In this respect, when each of arms 18 is slidably received or otherwise in communication with portion 16 of device 10, the distance between each cradle 35 is adjustable such that device 10 can be used with different sized vehicles and corresponding gear leg sizes.

Figure 3:
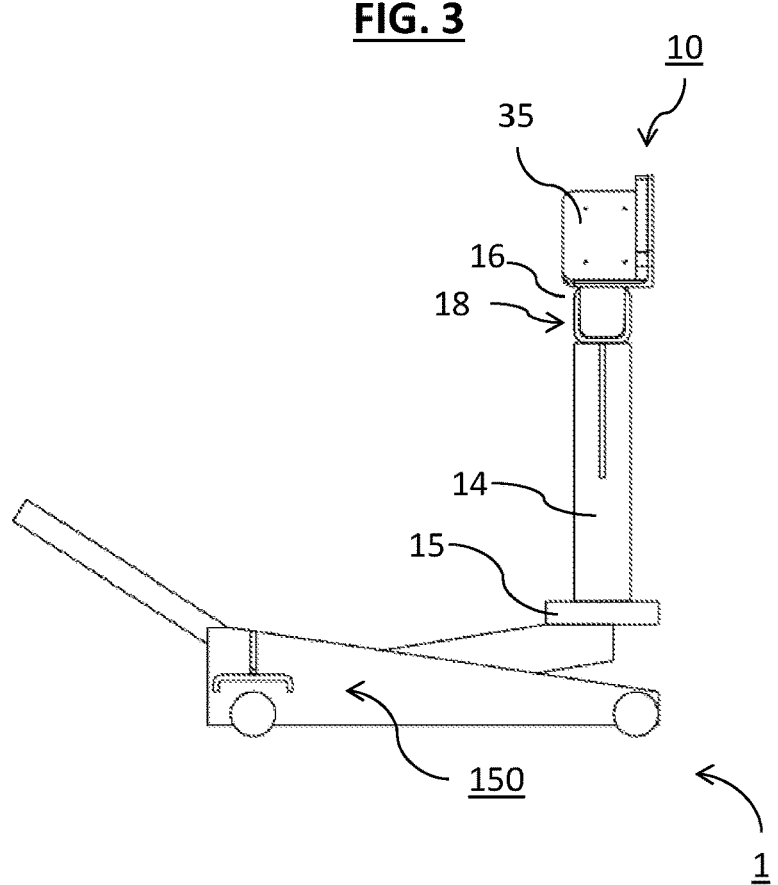
FIG. 3 is a side plan view of the exemplary embodiment of FIG. 1.
Figure 4:
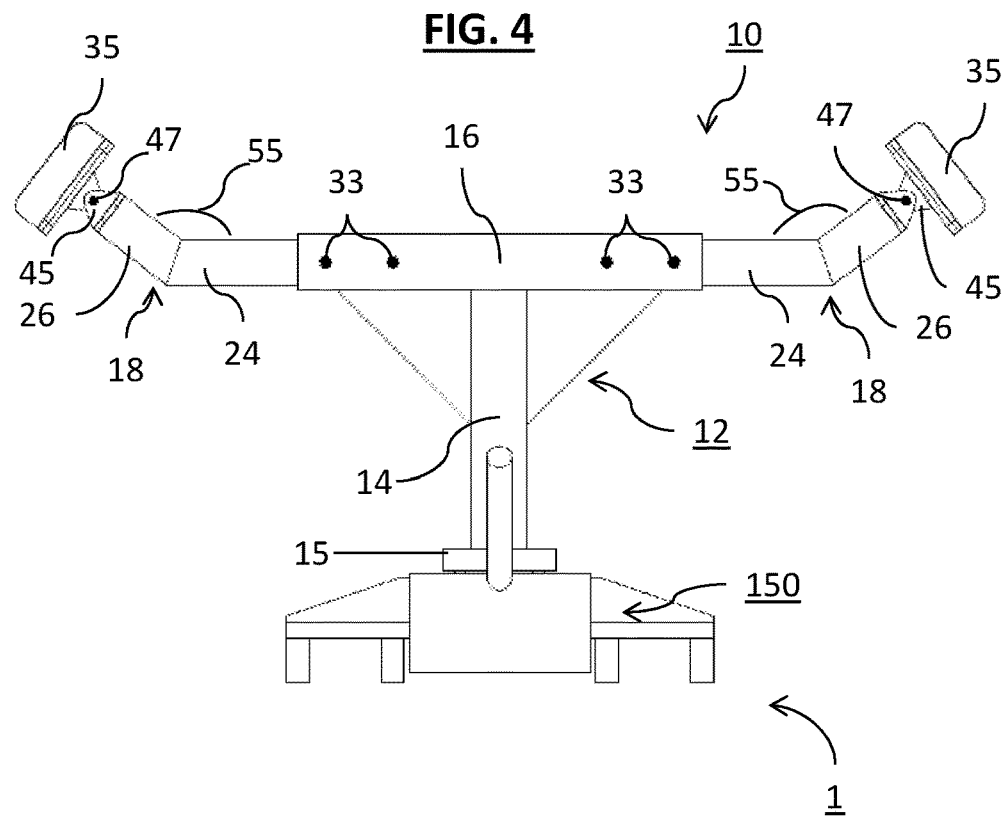
FIG. 4 is a forward plan view of the exemplary embodiment of FIG. 1.
Figure 5:
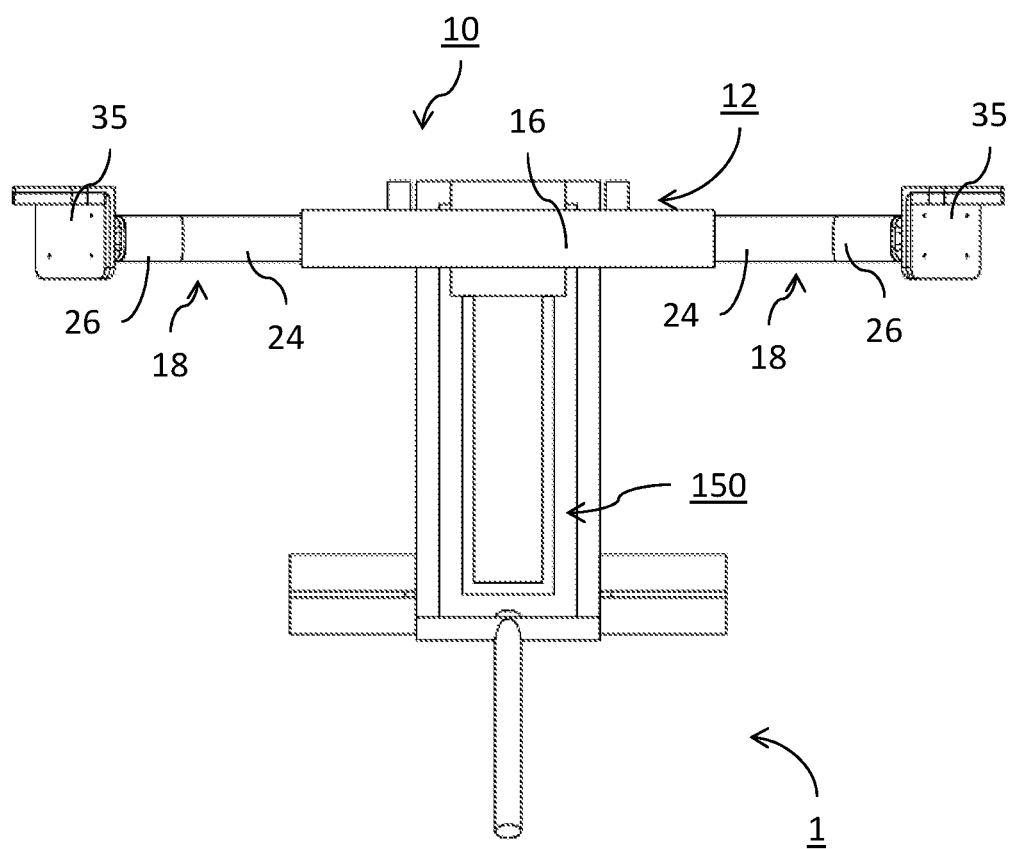
FIG. 5 is a top plan view of the exemplary embodiment of FIG. 1.

Preferably, portion 24 is substantially parallel with portion 16 when portion 24 is received or otherwise in communication with portion 16. Portion 26 may likewise extend away and upward from portion 24 to form angle 55. This can be seen particularly with reference to FIG. 4 which depicts the herein described system 1 and device 10 in a forward plan view with the device 10 assembled with mechanism 150 facing forward. It can be seen that angle 55 may be defined by portions 24 and 26 and may therefore range between ninety and one-hundred and eighty degrees. In certain embodiments, angle 55 may be adjustable through use of an adjustable hinge between portions 24 and 26. Preferably, however, angle 55 is fixed while cradle 35 and portions 24 and 26 may be permanently mounted to each other, for example, by welding. Similarly, FIG. 3 depicts a side plan view with mechanism 150 and corresponding device 10 rotated and FIG. 5 depicts a top plan view of the same so that certain aspects and relations of herein described features are visible.

Each cradle 35 may be constructed from resilient materials such as foam padding shaped and designed to securely receive a corresponding leg without damaging the same. In this respect, each cradle 35 may be L-shaped, U-shaped or otherwise designed with retaining shoulders that resiliently flex and both engage with a gear leg and move with said gear leg as it the leg is moved and/or pivoted while being lifted by system 1. Likewise, each arm 18 and/or corresponding portion 16 may be operable to flex a predetermined amount when system 1 is assembled under loading from a corresponding vehicle.

A cradle receiver 47 may be positioned on the tip of each distal portion 26, wherein receiver 47 may comprise a rotational shaft operable to rotably engage corresponding cradle coupler 45 of cradle 35. Cradle 35 may therefore rotate about the rotational shaft of receiver 47 as needed when the gear legs of the vehicle being lifted flex, bow, or otherwise move during use by system 1.

Figure 6:
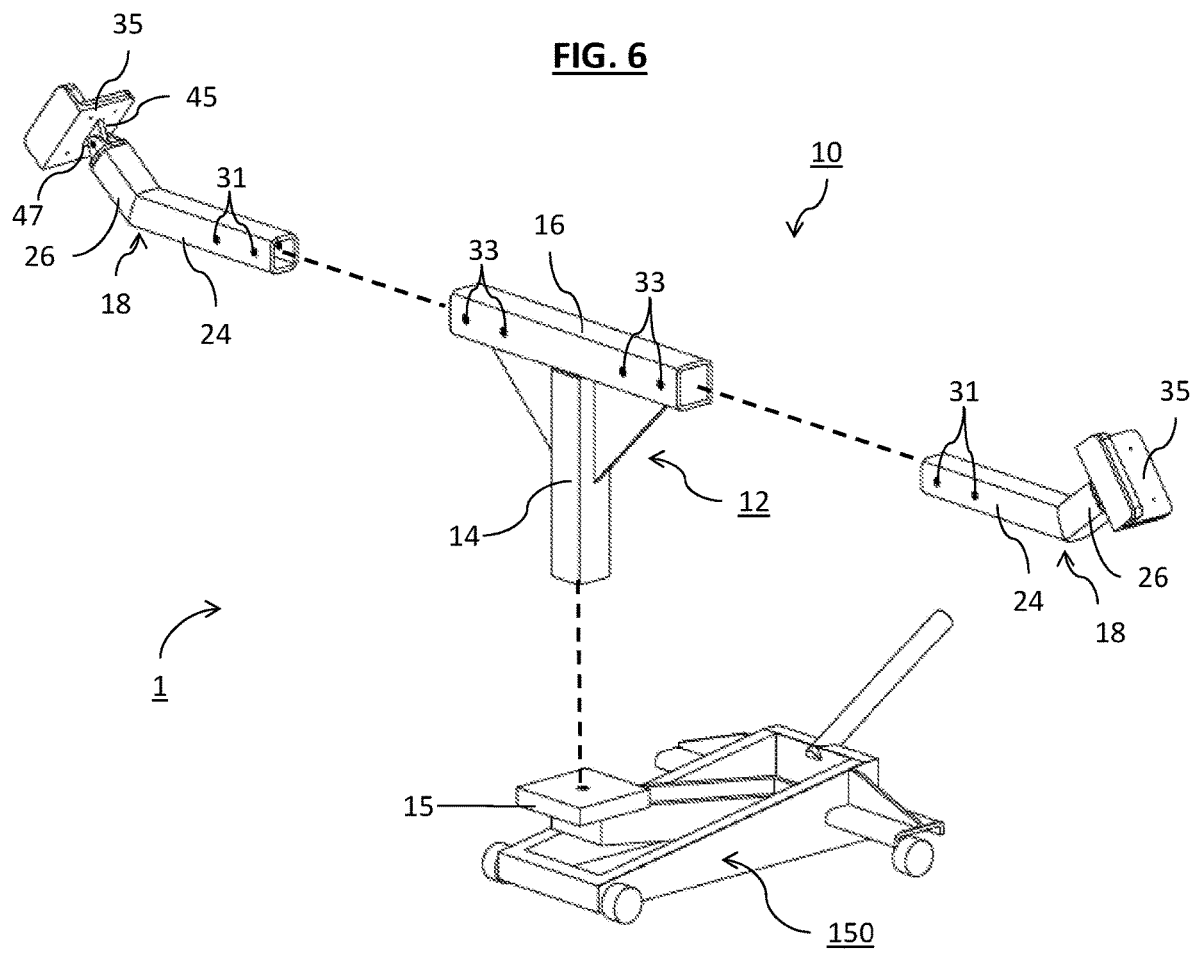
FIG. 6 is the forward perspective view of FIG. 1, wherein the components of the depicted system are in an exploded state prior to assembly.

FIG. 6 depicts a perspective view of the embodiments of FIGS. 1 and 2 in an exploded state so that all previously described features and relationships may be more clearly observed. Specifically, it can be seen that portion 14 of device 10 is inserted onto receiver 15 of mechanism 150 so that mechanism 150 may be equipped to deliver a lifting load to the portion 14 once device 10 is ready to lift a vehicle. Likewise, it can be seen that arms 18 may be slidably inserted or otherwise received by portion 16 as per the depicted dashed lines. In this embodiment, arms 18 can be seen comprising two alignment apertures 31 that correspond to fixed positions 33 of portion 16.

However, device 10 is not so limited and may comprise any number of positions 33 and corresponding aperture 31 as needed or desired. In practice, once portion 24 of arm 18 has been slid into or along portion 16, a predetermined position is selected based on the necessary length for the gear legs of the vehicle to be lifted. The predetermined position may be secured by any of the previously describing manners of secure fastening.

Once the desired position is selected and thus desired distance between opposing cradles 35 has been achieved, system 1 is ready to be placed in contact with two or more gear legs of a vehicle and lift the same simultaneously through a single control; namely, mechanism 150.

Figure 7:
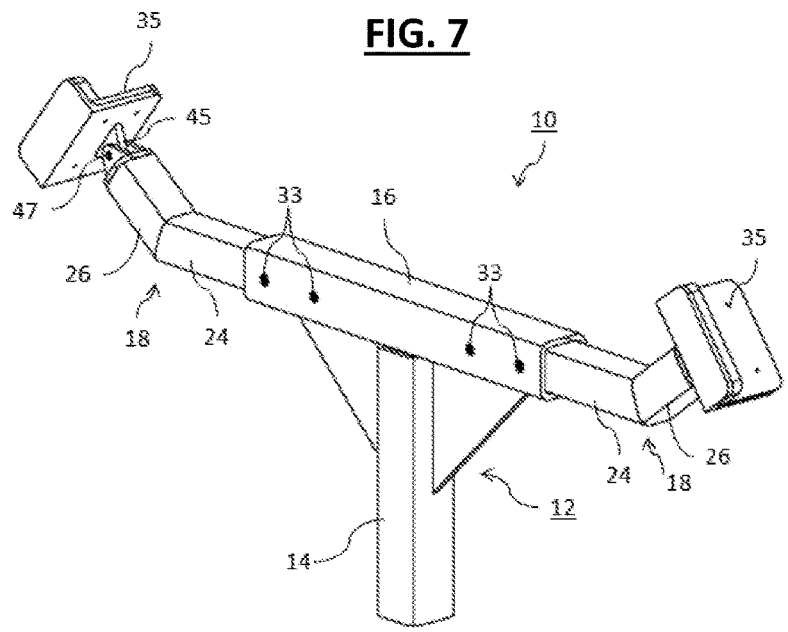
FIG. 7 is a forward perspective view of the disclosed jack device.

FIG. 7 depicts a close-up perspective view of device 10 when device 10 is not formed with or mounted to mechanism 150. The angle formed between portions 24 and 26 is clearly visible in this embodiment as well as the relationship between receiver 47 and coupler 45 to cause cradle 35 to pivot about receiver 47 as corresponding gear legs flex or otherwise moved during lifting and lowering.

Figure 8:
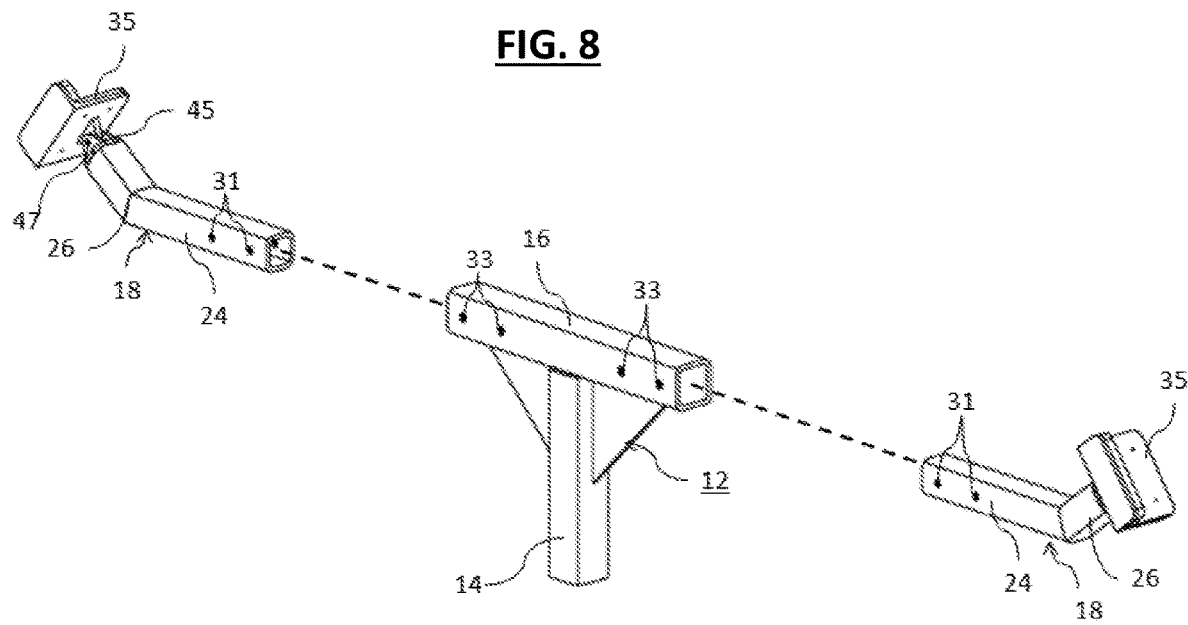
FIG. 8 is the forward perspective view of FIG. 7, wherein the components of the depicted device are in an exploded state prior to assembly.

FIG. 8 depicts a forward perspective view of the embodiments of FIG. 7, wherein device 10 is an exploded stated. As previously described, arms 18 may be slidably inserted, onto, along or otherwise received by portion 16 as per the depicted dashed lines. In this embodiment, arms 18 can be seen comprising two alignment apertures 31 that correspond to fixed positions 33. However, device 10 is not so limited and may comprise any number of positions 33 and corresponding aperture 31 as needed or desired. Likewise, positions 33 and apertures 31 may be defined by grooves, etches, channels, flexible teeth, or the like so that an operator can easily yet safely adjust arm 18 with respect to portion 16 to its desired position.

Once the desired position is selected and thus desired distance between opposing cradles 35 has been achieved, system 1 is ready to be coupled with mechanism 150 (not shown in this view) and then positioned to contact two or more gear legs of a vehicle.

Figure 9:
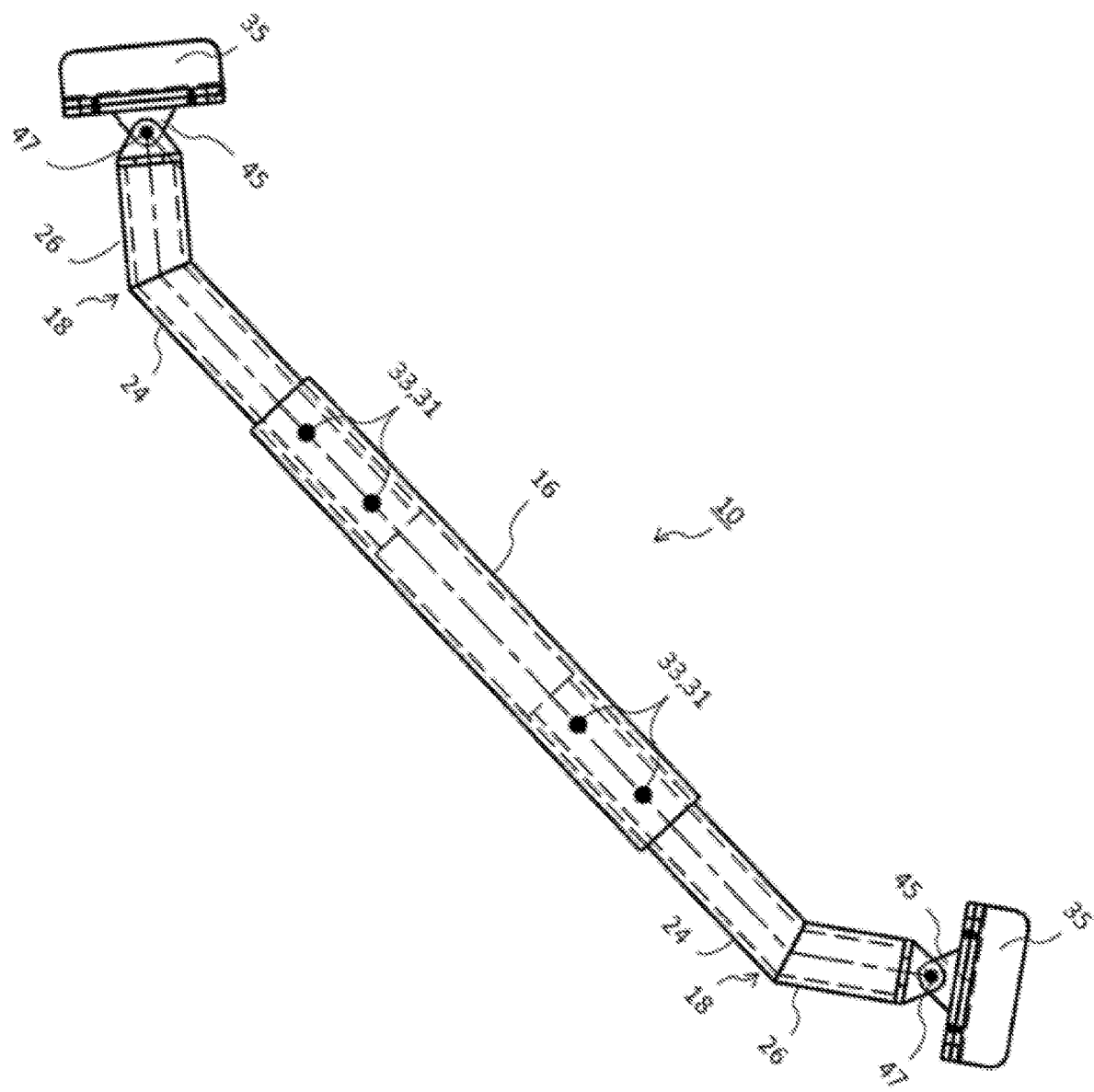
FIG. 9 is a top plan view of the device of FIG. 7 in phantom so that internal interconnection of components of device may be readily observable.

FIG. 9 depicts a top plan view of the device of FIGS. 7 and 8 in phantom lines so that previously described components can be readily observable as to how they interconnect in this embodiment. It can be seen that portion 18 is clearly inserted into and received by portion 16 of device 10 but device 10 is not so limited. As previously described, portion 18 may be configured to be slidably inserted over or otherwise couple portion 16 so that it has a larger cross section than portion 16. Likewise, it can be seen that each coupler 45 of cradle 35 rotates about receiver 47 only. However, coupler 45 and receiver 47 may be adjusted so that rotation and/or translation of cradle 35 as corresponding gear legs flex or move during lifting is operable to accommodate additional rotation and/or translation as needed.

Cradle 35 may therefore be operable to pivot in relation to portion 26 as corresponding gear legs of the vehicle being vary between models and sizes. In preferred embodiments, cradle 35 may be constructed from nylon plates (e.g. ¼ inch thickness) attached thereto with fasteners in order to avoid harm to the corresponding vehicle (e.g. paint scratches or dents) as well as to facilitate self-alignment with receiver 47.

Figure 10:
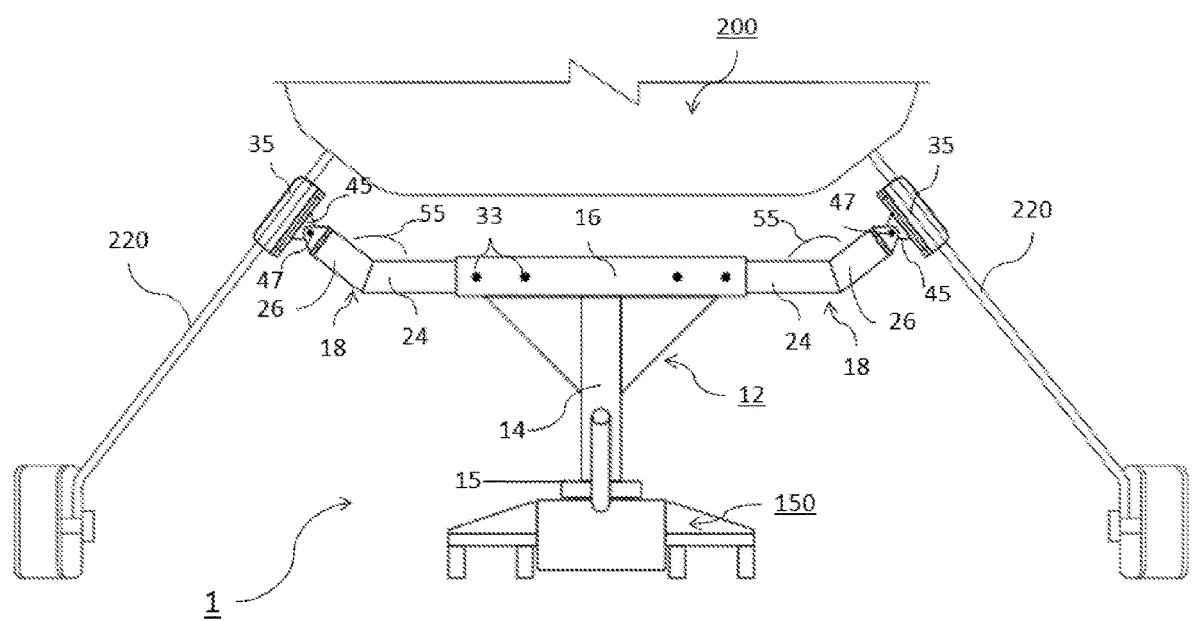
FIG. 10 is a forward plan view of the embodiments depicted in FIG. 1 when coupled to a conventional personal aircraft.

Turning to FIG. 10 is an exemplary embodiment of any of the previously described systems 1 in use with an exemplary vehicle 200 such as a personal aircraft. The operator may assemble device 10 with mechanism 150 to form system 1 and then position system 1 into place under vehicle 200 and below corresponding main gear legs 220. Once mechanism 150 positioned under the centerline of vehicle 200, mechanism 150 may be slowly raised (e.g. pumping the handle until each cradle 35 contacts and securely engages with corresponding legs 220). In some embodiments when the vehicle 200 is a conventional tail dragger aircraft, mechanism 150 causes device 10 to lift vehicle 200, one or more of the wheels of vehicle 200 may be caused to raise off the ground on which it previously sat. The vehicle 200 is now capable of being serviced by, for example, replacing, removing or otherwise servicing the lifted wheel.

It can be seen that the presently disclosed system 1 and lift device 10 is operable to lift both gear legs of a vehicle 200 from the upper portion of legs 220 where they exit the fuselage of vehicle 200. In preferred embodiments, cradles 35 are positioned nearby or adjacent to where legs 220 extend from vehicle 200 to more securely lift the vehicle itself versus currently known methods which include applying lift devices individually on a single leg 220 closer to the wheel (which in turn increases the amount of torque necessary for leg 220 to withstand).

The herein described device 10 may incorporate laterally extending arms 18 to provide lateral stability to legs 220 while simultaneously vehicle 200 in an elevated state. Where currently disclosed approaches tend to raise each gear leg separately and thus independently thereby requiring many adjustments of the plurality of individually controlled hydraulic lift mechanisms in order to keep column loading vertical as each leg 220 moves inboard to outboard between relaxed and lifted states, the herein described system 1 and device 10 lifts both legs 220 simultaneously and securely through a single mechanism 150 which both reduces risk of injury and ensures that the vehicle 200 can be easily serviced.

Figure 11:
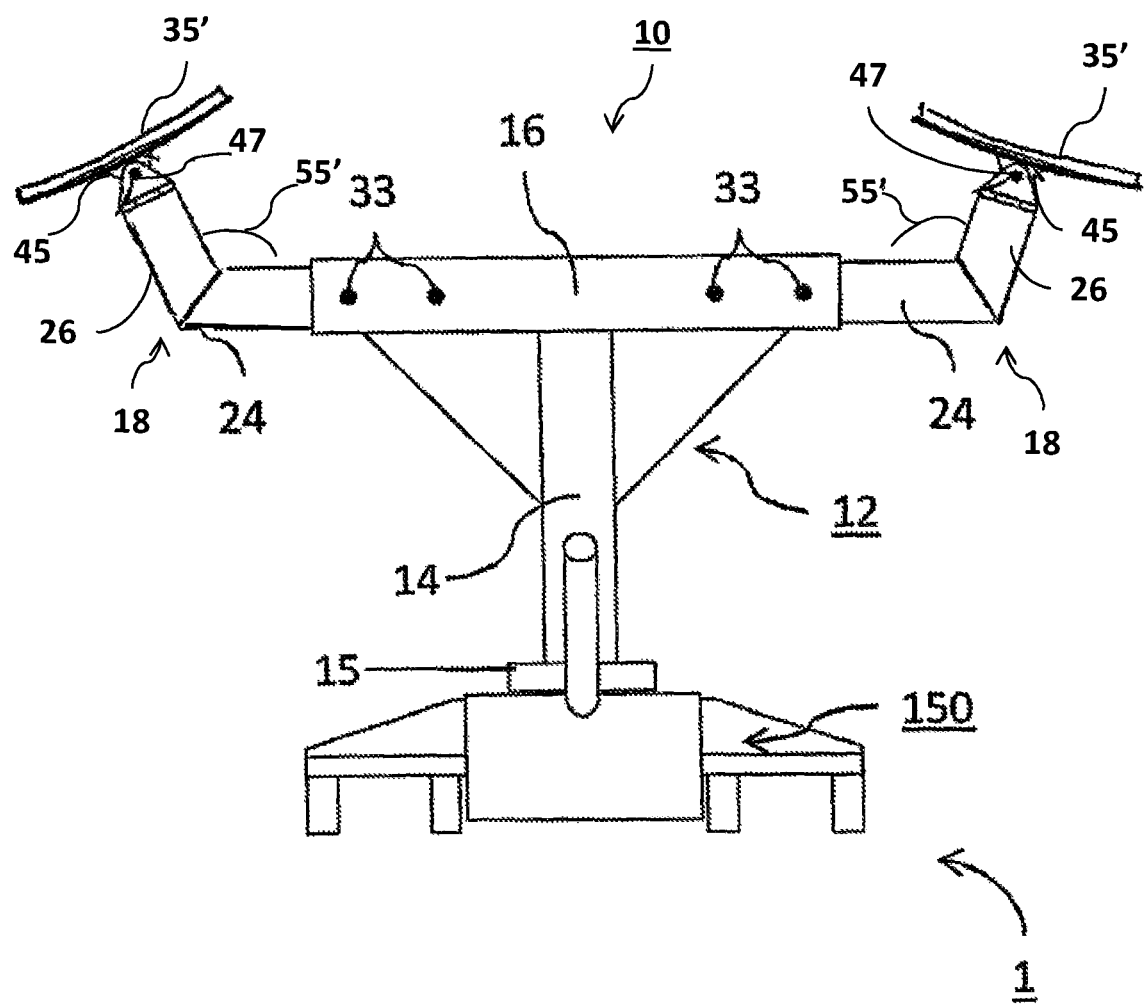
FIG. 11 is a forward plan view of another exemplary embodiment of FIG. 1.
Figure 12:
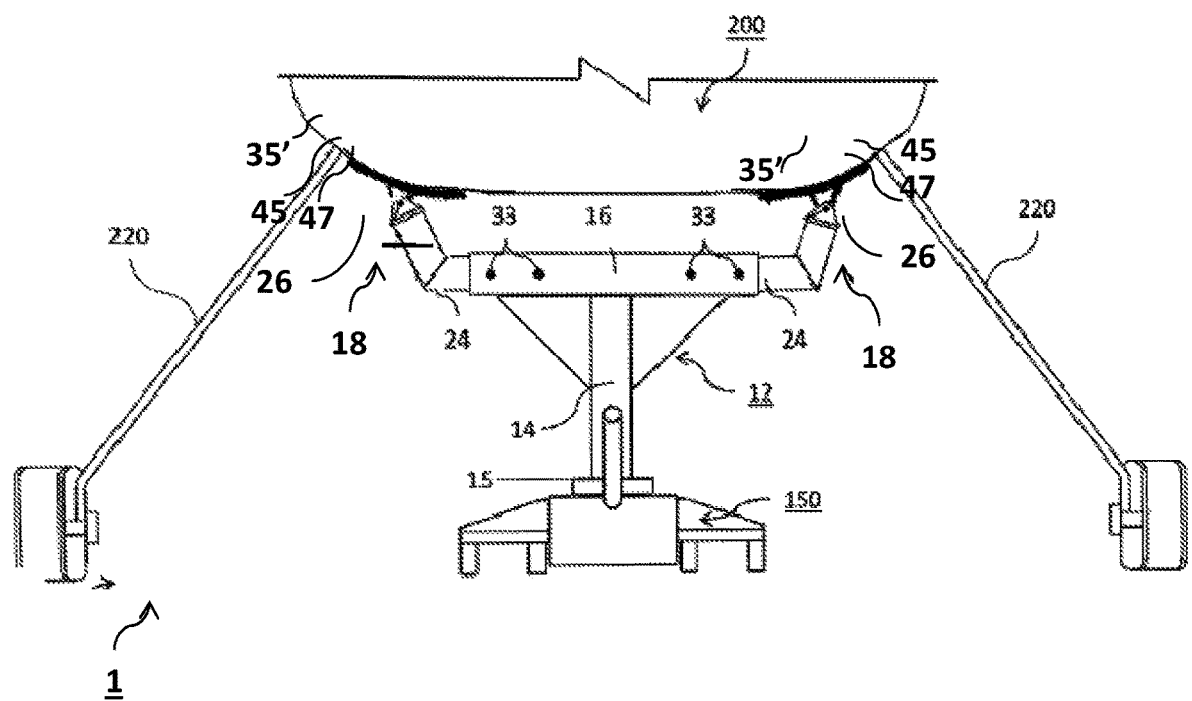
FIG. 12 is a forward plan view of the embodiments depicted in FIGS. 1 and 11 when coupled to an exemplary personal aircraft.

In other embodiments, lifting cradle 35 may be replaced with cradle 35' of FIGS. 11 and 12. FIG. 11 depicts a forward plan view of cradle 35' with the previously described system and FIG. 12 depicts a forward plan view of cradle 35' and corresponding system 1 when in use with exemplary vehicle 200. As can be seen, cradle 35' may be operable to instead apply a lifting force and/or be securely engage with and move exemplary vehicle 200 from its lower surface between one or more elevations. This is particularly advantageous where landing gear of vehicle 200 may be loose or otherwise insecure. In this respect, cradle 35' may be operable to be driven by corresponding portions 24 and 26 to engage the lower surface of vehicle 200 and lift the same without contacting legs 220. This also advantageous as it reduces risk of harm to legs 220.

Preferably, the angle 55' formed between portions 24 and 26 of FIGS. 11 and 12 is clearly visible in this embodiment as being relatively more acute versus the angle 55 previously depicted. However, angle 55' with cradle 35' is not so limited and any angle 55' between portions 24 and 26 may be used as needed or required.

Additionally, cradle 35' may be pivoted about receiver 47 and coupler 45 as the lower surface of the aircraft is moved between the one or more elevations or otherwise moved during lifting and lowering. Cradle 35' may be constructed from a pad operable to evenly distribute the lifting force across corresponding lifting regions of vehicle 200. Preferably, the lifting region of vehicle 200 corresponds with one or multiple bulkheads or otherwise reinforced portions of vehicle 200 to avoid damage to outer surfaces of vehicle 200 such as its exterior skin. Cradle 35' in this respect may measure 20 cm by 25 cm. However, cradle 35' in this embodiment is not so limited and may be any size or shape as needed or required. Additionally, cradle 35' may be trimmable by the end user to conform to a particular vehicle 200.

Cradle 35' may optionally include traction inducing surface operable to securely and safely contact the lower surface of vehicle 200 during use. In this embodiment, cradle 35' may be constructed from an elastomer, rubber, or the like operable to provide additional padding to vehicle 200 during lifting as well as further secure cradle 35' to vehicle 200 by reducing slippage between vehicle 200 and cradle 35' of system 1.

Many alterations and modifications may be made by those having ordinary skill in the art without departing from the spirit and scope of the embodiments disclosed and described herein. Therefore, it is understood that the illustrated and described embodiments have been set forth only for the purposes of examples and that they are not to be taken as limiting the embodiments as defined by the following claims. For example, notwithstanding the fact that the elements of a claim are set forth below in a certain combination, it must be expressly understood that the embodiments include other combinations of fewer, more or different elements, which are disclosed above even when not initially claimed in such combinations.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lifting system for an aircraft, comprising:
   the aircraft comprising a pair of wheel supported landing gear legs, each leg of said pair being laterally positioned on opposite sides of a central longitudinal axis of the aircraft; and
   a lifting device comprising:
   a central portion comprising a vertical elongate portion;
   first and second extending lifting arms, each arm extending away orthogonally from opposite sides of the vertical elongate portion of the central portion and comprising:
   a proximal portion extending laterally from the central portion and being slidably received by the central portion;
   a distal portion extending away from the proximal portion at an upward obtuse angle with respect to the proximal portion; and
   a lifting cradle disposed on the distal portion of the associated laterally extending lifting arm, each cradle is operable to lift a respective laterally positioned landing gear leg simultaneously with the other cradle of the other respective lifting arm;
   wherein each extending lifting aim and associated lifting cradle is operable to securely engage with landing gear legs of an aircraft and lift the aircraft when an upward force is applied by the central portion through the lifting cradles to the landing gear legs;
   wherein each cradle is configured to securely engage and pivot about a rotational shaft with a respective landing gear leg while lifting the aircraft, the rotational shaft being rotatably connected with a coupler of the distal portion.

2. The system according to claim 1, wherein the extending arms are removably attached with the central portion, wherein a distance between each of the lifting cradles is adjustable.

3. The system according to claim 2, wherein the distance is adjustable by slidably translating one or both of the laterally extending arms along a corresponding arm receiver of the central portion between a plurality of fixed positions.

4. The system according to claim 1, wherein the extending arms are removably attached with the central portion, wherein each extending arm is slidably inserted into a corresponding arm receiver of the central portion between a plurality of fixed positions.

5. The system according to claim 1, wherein the central portion comprises a hydraulic mechanism receiver oriented generally orthogonal to an extending arm receiver of the central portion operable to receive the extending arms.

6. The system according to claim 1, further comprising: a hydraulic mechanism received by the central portion.

7. The system according to claim 6, wherein each cradle is operable to adjustably lift the aircraft between a plurality of elevations, and wherein each cradle is L-shaped or U-shaped.

8. The system according to claim 6, wherein each cradle comprises retaining shoulders that resiliently flex and both engage with a respective landing gear leg during lifting and lowering.

9. The system according to claim 1,
wherein the upward obtuse angle is adjustable by operatively connecting the proximal and distal portions to each other through an adjustable hinge.

10. A lifting system, comprising:
an aircraft; and
a lifting device, comprising:
  a central portion comprising a vertical elongate portion;
  first and second extending lifting arms, each arm extending away orthogonally from opposite sides of the vertical elongate portion of the central portion and comprising a lifting cradle disposed on a distal portion of the associated laterally extending lifting arm;
  wherein each extending lifting arm and associated lifting cradle is operable to securely engage with a pair of lifting regions of a lower fuselage surface of the aircraft and simultaneously lift the aircraft between a plurality of elevations when an upward force is applied from the central portion through the lifting cradle to the corresponding lifting region of the aircraft, each pair of lifting regions being laterally positioned on opposite sides of a central longitudinal axis of the aircraft;
  wherein each cradle is configured to securely engage and pivot about a rotational shaft with a respective lower fuselage surface while lifting the aircraft, the rotational shaft being rotatably connected with a coupler of the distal portion; and
  wherein each cradle further comprises a cradle coupler extended downward from a lower surface of the cradle and pivotally attached to the rotational shaft.

11. The system according to claim 10, wherein each lifting cradle is defined by a pad attached to the cradle coupler operable to securely engage with one of the lifting regions of the aircraft, and wherein each cradle is operable to simultaneously lift the corresponding gear leg.

12. The system according to claim 10, wherein the pad of at least one lifting cradle comprises a predetermined curve operable to conform to the contour of one of the lifting regions of the aircraft.

13. The system according to claim 10, wherein the pad of at least one lifting cradle is constructed from a traction inducing surface operable to avoid slippage between the corresponding lifting cradle and the lifting region of the aircraft during lifting.

14. The system according to claim 10, wherein a distance between each of the lifting cradles is adjustable, wherein the distance is adjustable by slidably translating one or both of the laterally extending arms along a corresponding arm receiver of the central portion between a plurality of fixed positions.

15. The system according to claim 10, wherein each extending arm is slidably inserted into a corresponding arm receiver of the central portion between a plurality of fixed positions, wherein each extending arm is securely engaged in each fixed position through use of one or more fastening mechanisms.

16. A method of lifting an aircraft, comprising:
positioning a lifting device under the aircraft, the aircraft comprising a pair of lifting regions,
each lifting region of said pair being laterally positioned on opposite sides of a central longitudinal axis of the aircraft,
the lifting device comprising:
  a central portion comprising a vertical elongate portion;
  first and second extending lifting arms, each arm extending away orthogonally from opposite sides of the vertical elongate portion of the central portion and comprising:
    a proximal portion extending laterally from. the central portion and being slidably received by the central portion;
    a distal portion extending away from the proximal portion at an upward obtuse angle with respect to the proximal portion; and
    a lifting cradle disposed on the distal portion of the associated laterally extending lifting arm, each cradle is operable to lift a respective laterally positioned lifting region simultaneously with the other cradle of the other respective lifting arm;
securely engaging each lifting cradle with one of the laterally positioned lifting regions; and
applying a lifting force to the central portion thereby causing each lifting cradle to simultaneously lift the corresponding laterally positioned lifting regions.

17. The method of claim 16, wherein each lifting region comprises a wheel supported landing gear leg laterally positioned on opposite sides of the central longitudinal axis of the aircraft.

18. The method of claim 16, wherein each lifting region comprises a lower fuselage surface of the aircraft and laterally positioned on opposite sides of the central longitudinal axis of the aircraft.

* * * * *